United States Patent [19]

Smith

[11] Patent Number: 4,526,393

[45] Date of Patent: Jul. 2, 1985

[54] METHOD FOR MOVING A GRANDSTAND AND A HITCH FOR CONNECTING A TRACTOR TO AN IMPLEMENT TO BE TOWED.

[76] Inventor: L. G. Smith, 7710 Morris Rd., Hilliard, Ohio 43026

[21] Appl. No.: 497,429

[22] Filed: May 24, 1983

[51] Int. Cl.³ .............................................. B60D 1/00
[52] U.S. Cl. ................................... 280/406 R; 52/6; 52/10; 52/143
[58] Field of Search .......... 280/406 R, 415 R, 415 A, 280/415 B, 461 R, 461 A, 497; 52/10, 6, 143; 172/449, 444, 445, 441, 442, 450

[56] References Cited

U.S. PATENT DOCUMENTS

| | | | |
|---|---|---|---|
| 1,354,654 | 10/1920 | Johnston et al. | 280/490 R |
| 1,481,376 | 1/1924 | Klein | 280/461 R |
| 1,506,595 | 8/1924 | Lohmeyer | 280/456 A |
| 2,377,315 | 6/1945 | Beitzel | 280/406 R |
| 2,473,786 | 6/1949 | Collins | 37/140 |
| 2,527,343 | 10/1950 | Wilson | 280/456 R |
| 2,693,969 | 9/1954 | Simpson | 280/460 A |
| 2,710,569 | 6/1955 | Altgelt | 280/461 A |
| 2,815,223 | 12/1957 | Wharton | 280/406 R |
| 2,874,975 | 2/1959 | Fraga | 172/441 X |
| 2,989,128 | 6/1961 | Gaines, Jr. | 172/447 |
| 3,233,682 | 2/1966 | Thompson | 280/406 R |
| 3,346,273 | 10/1967 | Folkerts | 280/457 |
| 3,447,816 | 6/1969 | Shannon | 280/415 R |
| 3,583,494 | 6/1971 | Thompson et al. | 280/406 R |
| 4,162,594 | 7/1979 | MacKintosh | 52/143 |

FOREIGN PATENT DOCUMENTS 1112464  8/1961  Fed. Rep. of Germany ... 280/415 R

*Primary Examiner*—John A. Pekar
*Attorney, Agent, or Firm*—Sidney W. Millard

[57] ABSTRACT

An improvement to the 3-point hitch standardly found on tractors of the type having an implement lift mechanism, including the addition of a joining apparatus which allows the tractor to turn without requiring a plow or other earth working implement being towed by the tractor to be removed from the ground in order to complete the turn. The joining apparatus connects to the load bars of the standard 3-point hitch and includes a pivotable connection located in the middle of a crossbar that connects the ends of the load bars. Tie bars are mounted at the pivotable connection and to the 3-point hitch connection points on the implement. In this way the implement may be allowed to turn and be maintained at an orientation different than the orientation of the tractor.

6 Claims, 3 Drawing Figures

METHOD FOR MOVING A GRANDSTAND AND A HITCH FOR CONNECTING A TRACTOR TO AN IMPLEMENT TO BE TOWED.

FIELD OF THE INVENTION

The invention relates to an improved hitch for connecting a tractor unit of the type having a lift mechanism to an implement, and more particularly relates to an improvement of the standard farm tractor to implement 3-point hitch assembly.

BACKGROUND OF THE INVENTION

The popular standard 3-point hitch that is utilized on farm tractors for the attachment of various farm implements such as plow and harrow has also been utilized to tow trailers, wagons, parade floats and other such implements by means of a farm tractor. A standard 3-point hitch exists in several forms as for example one of the type in which a first and second load bar have their proximal ends attached to the tractor and their distal ends pivotally attached to the implement itself. The load bars are spaced apart and parallel to each other and are disposed in a horizontal plane relative to one another. The third point of a 3-point hitch is a connection either by a bar or by a chain between the lift mechanism on the tractor unit to a point or attachment pad on the implement which is located vertically above the horizontal plane in which the two load bars are attached to the implement. The third point of the 3-point hitch though described as utilized to lift the implement by means of the lift mechanism on the tractor unit, the actual forces of towing are carried by the load bars which, as described above, are spaced apart from each other. An alternative form of the 3-point hitch is one in which the aforementioned first two points which are low on the tractor body and horizontally disposed relative to one another are the lifting mechanism while the third higher point is a fixed point and not part of the lift mechanism. A number of variations on the standard 3-point hitch exist and these are but two of them. The popularity of the 3-point hitch has been that it is adaptable to a wide variety of implements and gives the flexibility of being able to utilize the lift mechanism of the standardly available farm tractors. Those lift mechanisms being either of the geared or the hydraulic lift type. In this way any implement which is attached to a suitably designed tractor with the standard 3-point hitch may be towed and also raised or lowered by means of the 3-point hitch assembly.

The 3-point hitch does pose additional problems for the operator of the tractor attempting to work the earth with an implement. With the implement in the lowered or working position the implement is held in a substantially rigid manner relative to the tractor unit thereby preventing the implement from being turned by the force of the tractor. If a farmer intends to turn a corner with plows or harrows in the working position, he is forced to make wide sweeping turns because of the rigidity with which the implement is maintained behind his tractor unit. The wide sweeping turns are possible but even these subject the implement and the tractor to considerable forces which are markedly different from the forces normally encountered in straight line use of the implement in earth working. When relatively small radius turns are necessary, the implement must be raised, the turn made by the tractor and then the implement lowered back to an earth working position only after the turn has been completed.

Additionally, problems have been encountered in the moving of grandstand assemblies of the type found around high schools and junior high schools, said grandstand assembly occasionally being required to be moved from location to location in order to accommodate the needs of various sport events and the increased or decreased needs for grandstands of various school facilities. In the past standard grandstand assemblies have been provided with skid type bases which can be dragged from location to location, however the use of these skids is impractical if the grandstand must be transported over a paved road surface or over any considerable distance.

Therefore, there is a need for an improvement in the 3-point hitch that will allow a tractor to make turns with an implement in the working or earth working type position without the necessity of having to raise the implement from its working position prior to making a turn. Additionally, there is a need for a method of transporting grandstands between locations by other than dragging them across the ground which tends to damage the grass and also result in damage to the grandstand from paved surfaces or other obstacles that lie in the path over which the grandstand must be transported.

SUMMARY OF THE INVENTION

I have discovered an improvement in the standard 3-point hitch utilized on tractor units having an implement lift mechanism comprising a first load bar being horizontally disposed, the proximal end of which is connected to a tractor unit, a second load bar also being horizontally disposed with its proximal end being connected to a tractor unit, said load bars being disposed parallel to and spaced apart from one another in a horizontal plane; a cross-bar being horizontally disposed and fixedly connected to the respective distal ends of said first and second load bars and bearing a pivotal connection means intermediate said connections to said first and second load bars; a first joining bar the proximal end of which is pivotally attached to said pivotable connection means of said cross-bar, the distal end of said first joining bar being pivotally attached to said implement, a second joining bar the proximal end of which is pivotally attached to said pivotable connection means of said cross-bar, the distal end of said second joining bar being pivotally attached to said implement at a point spaced apart from and horizontally disposed relative to the place of attachment of said first joining bar and a lifting means attached to said first and second joining bars and being connected to said implement lift mechanism of said tractor unit.

Another aspect of the present invention resides in an improvement to a standard 3-point tractor hitch wherein the improvement comprises a joining apparatus placed intermediate the distal ends of said first and second load bars and said implement, wherein a cross-bar is horizontally disposed and fixedly connected to the respective distal ends of the first and second load bars of the 3-point hitch and bears a pivotable connection means intermediate said connections to said first and second load bars. A first joining bar has its proximal end pivotally attached to said pivotable connection means of said cross-bar, the distal end of said first joining bar is pivotally attached to said implement. A second joining bar has its proximal end pivotally attached to said pivotable connection means of said cross-bar. The distal end of said second joining bar being pivotally attached to said implement at a point spaced apart from and horizontally disposed relative to the place of attachment of said first joining bar. A lifting means is attached to said first and second joining bars and is connected to the implement lift mechanism of said tractor unit.

Another aspect of the present invention resides in the provision of a method for moving grandstands comprising the steps of disposing on at least one end of the base of a grandstand structure two horizontally spaced apart tow point means; releasably attaching said tow point means to a tractor unit of the type having an implement lift mechanism by means of a hitch which comprises a first load bar which is horizontally disposed, the proximal end of which is connected to a tractor unit, a second load bar also being horizontally disposed, the proximal end of which is connected to the tractor unit, said load bars being disposed parallel to and spaced apart from one another in a horizontal place; a cross-bar being horizontally disposed and fixedly connected to the respective distal ends of said first and second cross-bars and bearing a pivotably connection means intermediate said connections to said first and second load bars; a first joining bar the proximal end of which is pivotably attached to said pivotable connection means of said cross-bar, the distal end of said first joining bar being pivotally attached to said implement, a second joining bar the proximal end of which is pivotally attached to said pivotal connection means of said cross-bar, the distal end of second joining bar being pivotally attached to said implement at a point spaced apart from and horizontally disposed relative to the place of attachment of said first joining bar, the distal ends of said joining bars being configured to be connected to said tow point means; a lifting means attached to said first and second joining bars and being connected to the implement lift mechanism of said tractor unit; lifting the end of said grandstand structure and removably attaching at least one wheel assembly which comprises a wheel, an axle, and an axle support. Said axle support being fixedly attached to said grandstand structure at a place intermediate the ends of said grandstand structure; lowering the end of said grandstand structure thereby placing the weight of the grandstand on said removably attached wheel assembly; towing said grandstand to a desired location by means of said hitch.

DETAILED DESCRIPTION OF THE INVENTION

Figure 1:
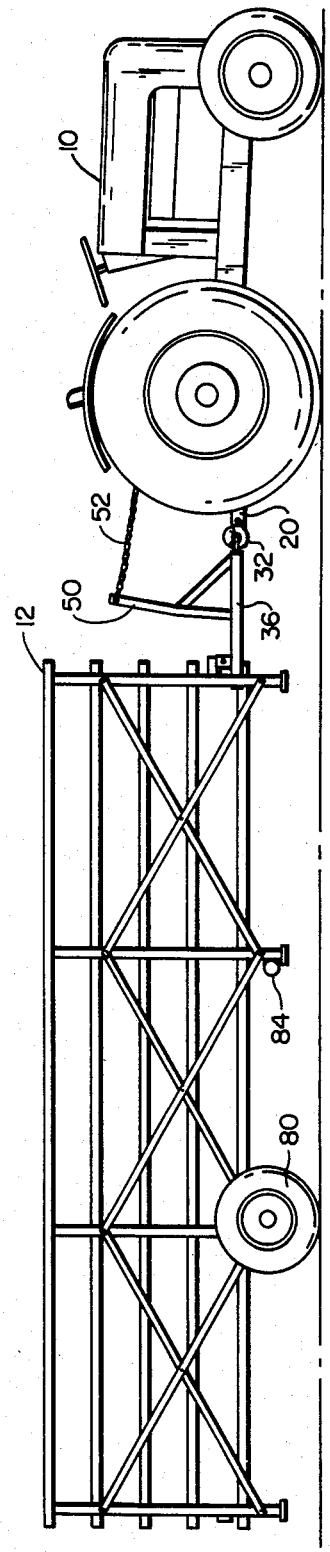
FIG. 1 is an elevation of a tractor unit connected to an implement by means of a hitch according to the present invention.

FIG. 1 is an elevational view of a tractor unit 10 connected to an implement 12 by means of a hitch according to the present invention. The hitch assembly is more clearly understood by reference to both FIGS. 1 and 2 in the following description. The implement may be a typical farm implement such as a multiple bottom plow, a harrow disc or may be a grandstand or other object towable by the tractor 10. The typical tractor 10 is provided with at least two connection points near the rear of the main tractor frame. These may take the form of drilled plates or lugs for pinlike connection to other apparatus or may be part of the lift mechanism. Those familiar with the art of tractors and 3-point hitch assemblies will recognize that load bars 18 and 20 are portions of the lift mechanism of a standard 3-point hitch but alternatively may be fixed or even pivotable points that are not portions of the lift mechanism, the lift mechanism being operated by the third point. When mention is made of a lift mechanism, it may refer to either the lift mechanism type utilizing the two lower points or the lift mechanism type utilizing the third point of the 3-point hitch. It will be appreciated that the present invention may be practiced with either or any other type of 3-point hitch assembly standardly available on tractors. In the present configuration, load bars 18 and 20 are respectively the lower tow "points" of a 3-point hitch. The load bars 18 and 20 are disposed parallel to each other in a horizontal plane and spaced apart. The load bars 18 and 20 are typically approximately 2 to 4 feet in length (61–122 cm.) and terminate at drilled holes for pin connections 26 and 28 and connection to cross-bar 30. Cross-bar 30 is typically a steel bar spanning the distance between the parallel load bars 18 and 20 and ending with pin connections 26 and 28 for attachment to the load bars.

Figure 2:
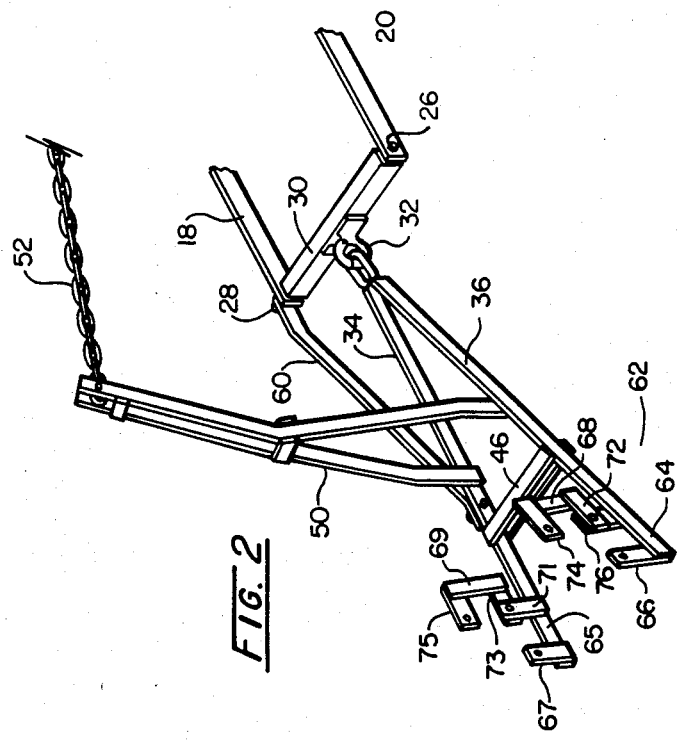
FIG. 2 is a perspective view of a hitch according to the present invention.

Cross-bar 30 bears near its midpoint, a point intermedite the connections 26 and 28 to the load bars, a pivotable connection 32. Such a pivotable connection point may be either a penal hitch attachment or preferably a ball-type hitch. The purpose of the pivotable connection 32 is to provide the ability for the tie bars 34 and 36 to pivot through an arc of greater than 45° in both the vertical and horizontal planes while still being retained by the hitch assembly. The proximal ends of tie bars 34 and 36 are connected respectively to the pivotable hitch 32. The distal ends of the tie bars each bear an end assembly 62 configured to receive a tow point means, preferably a steel bar attachment to a grandstand structure with a rectangular cross-section. FIG. 2 displays end assemblies 62 on the distal ends of tie bars 34 and 36. An extension of tie bar 36, 64 has vertical retainers 66 67, 71, 76 attached thereto; to vertical retainer 76 is pivotally mounted bar 72 which is fixedly attached to right angle extensions 68 and 74 the combined assembly of bars 72, 68 and 74 being pivotally configured to close to vertical retainer 66 thus trapping a rectangular bar tow point means located on a grandstand. Likewise, extension 65 of tie bar 34 bears vertical retainers 67 and 71; vertical retainer 71 is pivotally attached a three-sided rectilinear piece comprised of bar 73, 69 and 75 which are again configured to close to vertical retainer 67 thus retaining a second tow point means mounted upon a grandstand assembly.

The typical grandstand that is used in educational facilities is a lightweight structural steel assembly having wooden plank type seating. The understructure of such a grandstand unit is a simple crosswork truss having a rectangular type base near and parallel to the ground. In utilization of the present method the grandstand base assembly was modified by adding bar shaped tow points spaced apart the distance between the ends of the tie bars of the improved 3-point hitch apparatus above described. The ends of the tie bars have been modified to be lockably engageable of the bar shaped tow points by end assemmblies 62. A tractor with the hitch apparatus above described in place and with the modified ends on the tie bars also in place was backed to one end of the grandstand to be moved and the modified tie bar ends engaged to and connected to the bar shaped tow points. The lift mechanism of the tractor was then engaged and by applying a force with a chain against hoist bar 50 the end of the grandstand was raised above the ground, pivoting about the opposite end of the grandstand as a lever would. The central portion of the grandstand was raised to a sufficient height to receive a removable wheel assembly, understood more clearly by reference to FIG. 3, which were placed into short pipe sections that had previously been installed in the central portion of the grandstand near the ground. The bracing bar between hoist bar 50 and the forward end of the tie bars 34, 36 as shown in FIG. 1 is not illustrated in FIG. 2 merely to better show the relative structural features of the other struts and beams.

Figure 3:
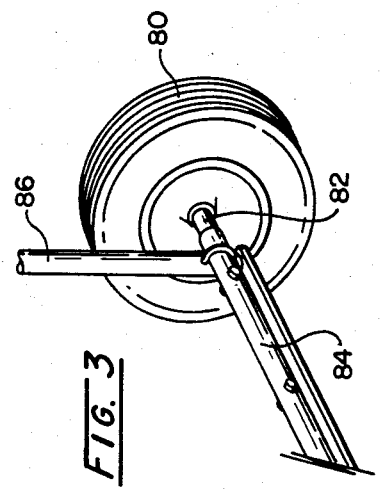
FIG. 3 is a detail of a wheel assembly used with the present invention.

FIG. 3 is a detail of a wheel assembly used with the present invention. A wheel 80 is mounted on an axel 82. The wheel and axel are rotatably retained within axel support 84, preferably a short pipe section of larger internal diameter than the outside diameter of axel 82. Axel support 84 is fixedly mounted to the base structure of a typical grandstand assembly as typified by support 86. Once the wheel assemblies were in place the lift mechanism on the tractor was lowered partially to allow the grandstand to shift its weight to the wheel now pivoting about its midpoint on the wheels which act as a fulcrum. However, the lift mechanism was not fully lowered to the ground but simply maintained the grandstand in a level position. With the grandstand in a level position resting fully on the wheels, the grandstand was fully off the ground. In this configuration the grandstand could then be towed to any point without any structural damage occuring to the grandstand. Once the grandstand has arrived at its final destination, the process is repeated, the wheels removed and the grandstand fully lowered to the ground. The tie bars are then removed from the tow points and the tractor taken away.

It will be appreciated that a number of configurations to the tow points may be utilized. They may be bar shapes, they may be hooks on eyes or other connection pads and they will function equally well provided that the ends of the tie bars on the hitch assembly are configured to received the tow points as designed.

Alternatively, the distal end of tie bars 34 and 36 may be modified to receive pin connections on a standard farm implement. It should be noted that the connection points on a farm implement to which tie bars 34 and 36 would connect are those to which a standard 3-point hitch would be directly connected to a standard farm implement; but in the present case and intervening joining apparatus comprising the tie bars, the cross-bar and a hoist bar are inserted between the standard 3-point hitch load bars and the farm implement itself.

In FIG. 2 a cross-tie bar 46 is shown spanning the distance between the tie bars 34 and 36. The purpose of cross-tie bar 46 is to maintain the angular relationship between the tie bars even when not connected to an implement 12. Hoist bar 50 to rises above the plane of adjoining apparatus and provide a point of connection by means of a tendon or chain between hoist bar 50 and the third point of the 3-point hitch. It will be appreciated that a number of different configurations of hoist bar 50 may be anticipated in the present description and that shown in the drawings is merely one of convenience to provide a point of location for the connecting tendon 52. Additionally, it will be appreciated that tendon 52 may be configured to connect directly to a raised connection point on implement 12 via a splice bar, not shown to impart the lifting forces directly to the implement, this would be the most advantageous in the case of a plow or harrow since the connection points to an implement are generally pivotable and the raising of the joining apparatus would not necessarily raise the implement. The connection of the tendon to a point on the implement 12, not shown in the figures, could be a second tendon extending from hoist bar 50 to the implement or could simply be a longer tendon by-passing the hoist bar 50, thereby imparting the force from the lift mechanism directly to the implement and not by means of the hoist bar 50.

Also shown in FIG. 2 is an anti-sway bar 60 which tends to hold the joining apparatus in generally rigid alignment with the load bars. The addition of anti-sway bar 60 produces the effect of the traditional 3-point hitch wherein the towed implement will remain in fixed orientation as viewed from above relative to the tractor. In this way, if it is desired to maintain such precise alignment of the implement to the tractor, this can be accomplished by the simple addition of the anti-sway bar 60. Anti-sway bar 60 is connected by pin connections between the load bar and the tie bar. It will also be appreciated that the anti-sway bar may be utilized in a number of configurations and also may be utilized on either or both sides of the apparatus to provide the level of rigidity that is required in a given set of circumstances.

One of the original uses to which the improved 3-point hitch arrangement shown in FIGS. 1 and 2 was placed was in the moving of small grandstand units around an educational facility and between educational facilities, especially along paved roads. In conjunction with the improved 3-point hitch a method for moving grandstands from point to point has been developed wherein the grandstands are raised and placed upon wheels and towed between points.

It will be appreciated that numerous changes and modifications may be made in the above described embodiments of the invention without departing from the scope thereof. Accordingly, the foregoing description is to be construed in an illustrative and not in a limitative sense, the scope of the invention being defined solely by the appended claims.

I claim:

1. A method of moving a grandstand, said grandstand including a plurality of end standards for engaging a grandstand supporting surface, the method comprising,
    mounting cylindrical support means on said grandstand intermediate the end standards with the axis of said cylindrical support means being (1) substantially horizontal with respect to the surface supporting the grandstand and (2) perpendicular to the intended direction of movement of the grandstand,
    mounting a connection point on one end standard of said grandstand,
    connecting a hitch to said connection point with said hitch and point being configured to allow relative rotation about an axis substantially parallel to said axis of said cylindrical support means,
    lifting the hitch, connection point and the one end of the grandstand while the end standard on the other end of the grandstand remains in contact with the support surface,
    then mounting a pair of wheels on and coaxial with said cylindrical support means, the wheels having a radius greater than the distance from the axis of the cylindrical support means to a plane coextensive with the lowermost points of the end standards, lowering the hitch until the wheels engage the supporting surface and the end standards are all out of contact with the supporting surface, pulling the grandstand to a different location.

2. The method of claim 1 including connecting the hitch to a tractor at two vertically spaced points, lifting the hitch by rotating the upper hitch conneciton point about the lower hitch connection point.

3. A hitch for connecting a tractor to an implement to be towed comprising, a pair of spaced apart load bars, each bar being connected to the tractor and said bars being joined together at their distal ends by a cross-bar, a pair of tie bars joined together at one end and spaced apart at the other end, means connecting the joined ends of the tie bars to the cross-bar for relative universal pivoting through angles of greater than 45° in both the vertical and horizontal planes, the spaced apart ends of the tie bars each including a means for connecting to an implement, a hoist bar extending vertically upward from a rigid attachment to both tie bars, a chain attached between the upper portion of the hoist bar and a power means for pulling the chain to thereby rotate the tie bars vertically about an axis through the connecting means between the cross-bar and the tie bars.

4. The apparatus according to claim 3 further comprising an anti-sway bar fixedly connecting at least one of said tie bars to at least one of said load bars.

5. The hitch of claim 3 wherein the connecting means between the tie bars and the implement is a pivotable connection allowing relative rotation of the implement about the connection in a vertical plane.

6. The hitch of claim 5 wherein the tie bars part of the connecting means between the tie bars and the implement includes a pair of pivotable clamps pivoted from a point intermediate the ends of the tie bars.

* * * * *